3,488,677
Patented Jan. 6, 1970

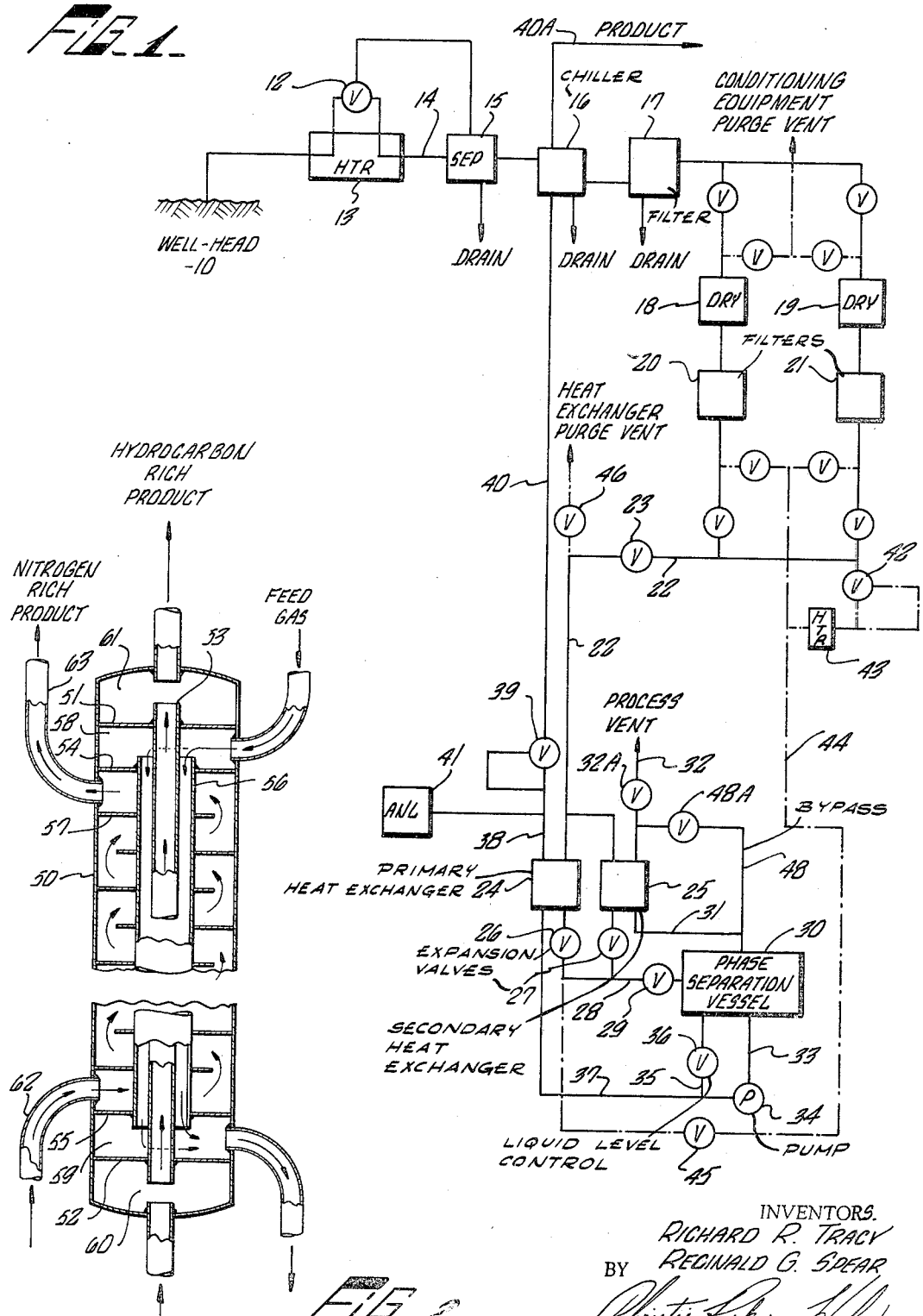

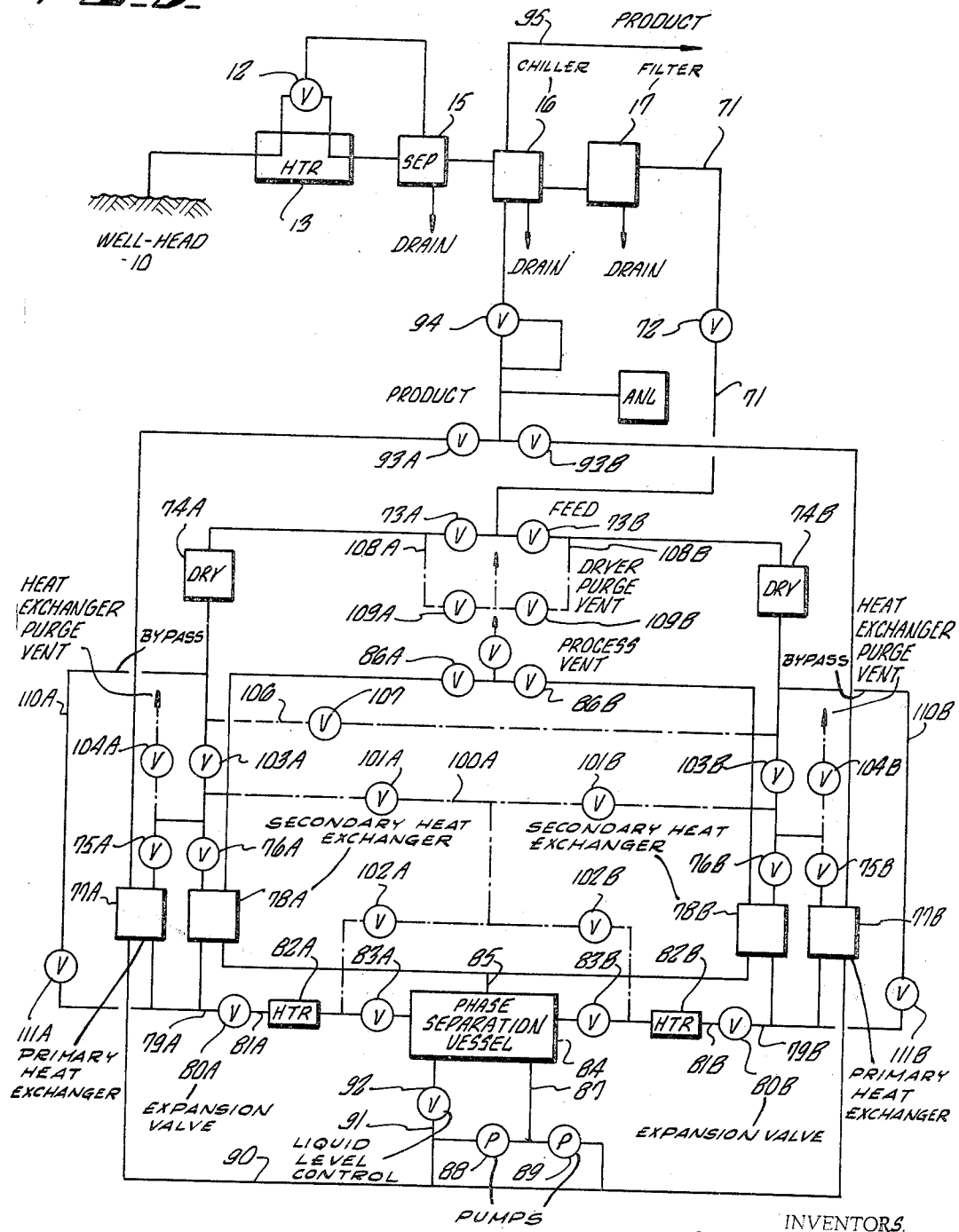

3,488,677
PROCESS FOR PURIFICATION OF NATURAL GAS
Richard R. Tracy, Pasadena, and Reginald G. Spear, San Marino, Calif., assignors to Tioga Wells Corporation, Pasadena, Calif., a corporation of California
Continuation-in-part of application Ser. No. 609,909, Jan. 17, 1967. This application Dec. 27, 1967, Ser. No. 693,820
Int. Cl. F25j 3/08, 3/00
U.S. Cl. 62—23      10 Claims

ABSTRACT OF THE DISCLOSURE

Process for the purification of natural hydrocarbon gases which, as may be produced at a wellhead, are contaminated by substantial proportions of incombustible constituents such as nitrogen. Contaminated gas at elevated pressure is condensed by cooling, thereafter expanded to approximately atmospheric pressure to effect phase separation between a hydrocarbon-rich liquid product and a contaminant-rich vapor product which are in turn separately employed to effect condensation of the contaminated hydrocarbon. The hydrocarbon-rich liquid product, essentially methane, and nitrogen are passed in out-of-heat exchange relation with each other and in heat exchange with natural gas in primary and secondary heat exchange means.

CROSS-REFERENCE TO OTHER APPLICATIONS

This application is a continuation-in-part of our copending application Ser. No. 609,909, filed Jan. 17, 1967, now abandoned, and entitled "Process for the Purification of Natural Gas."

BACKGROUND OF THE INVENTION

The presence of substantial proportions of incombustible constituents in produced natural hydrocarbon gases from wellheads or other sources can render such gases commercially useless since the contaminant content reduces the B.t.u. value of the gases below the minimum level acceptable for fuel purposes by gas distribution utility companies. The presence in the United States and other countries of known gas reservoirs which are substantially unexploited because the formation hydrocarbons are mixed with excessive quantities of nitrogen, generally in the range of 20% or more by volume, of itself indicates the need for an economical and effective process for purifying such natural gases to the extent required to meet commercial standards for its use as a fuel.

SUMMARY OF THE INVENTION

Through the present invention, there is provided a process which is economical with respect to operational and installation costs and yet enables purification of high-pressure contaminated hydrocarbon gases to the extent that such gases are made marketable. The process includes the first step of cooling the high-pressure contaminated natural gas to condense at least a substantial part of the gas stream by passing it in indirect heat exchange relationship with at least two separate fluid streams. The cooled feed mixture is then expanded to substantially atmospheric pressure to produce a single hydrocarbon-rich liquid phase and a single contaminant-rich vapor phase. The liquid and vapor phases are separated and are then separately passed as the fluid streams which cool the feed mixture by indirect heat exchange.

We have found that by expanding the mixture to substantially atmospheric pressure it is possible to obtain effective separation of the constituents without requirement of conventional fractionation. By this expansion of the chilled fluid to substantially atmospheric pressure, we have found that the methane entrained and discharged along with the contaminant in the gaseous phase is comparable in terms of energy value to the power requirement of reflux refrigeration in a conventional fractionation system. By "substantially atmospheric pressure" we mean a pressure as nearly atmospheric as possible and yet still maintain sufficient pressure in the expansion chamber to permit controlled removal of the contaminant-rich gas phase through the heat exchanger and vent system. Consequently, in practical applications, and in the absence of exhaust blowers, it is necessary to limit the pressure of the expanded fluid to several p.s.i. above atmospheric pressure.

The object of this and present conventional processes is to make available in usable form the latent fuel energy of the hydrocarbon. The measure of the effectiveness of such processes is the energy made available over and above that consumed in the operation of the process, i.e. the net energy production. We have discovered that by carrying out our process with the disciplines as set forth, the net energy production is substantially equal to that of much more complicated fractionation processes entailing much greater capital expenditures. Although a fractionation system is capable of recovering a greater percentage of the methane content of a given feed stream than is our process, it does so at the expense of the energy consumption required for reflux refrigeration.

Another important feature of the process necessary to achieve the substantial condensation of the feed stream is the manner of using the fluid product streams as heat exchange media for the feed stream. To this end it is important to take advantage of the greatest possible cooling capability of both product streams. This result is achieved in one embodiment of the invention by use of parallel countercurrent heat exchangers through which separate portions of the feed are passed in heat exchange relation to one product stream in one and the other product stream in the other. The two heat exchangers are sized with the relative heat capacity of the two product streams in mind and the feed stream is divided between the two exchangers in such proportions that the feed fractions flowing from the two are at substantially the same low temperature, and the two product streams emerge therefrom at substantially the same relatively higher temperature. In actual practice, slight adjustment of the proportions of the divided feed stream will be made in order to attain desired temperature profiles within the heat exchangers without significant departure from the criteria noted.

The foregoing objectives may also be accomplished by performing the heat exchange in such a manner that the portion of the feed cooled by one product stream and that portion cooled by the other product stream reach the same low temperature whether or not such portions are cooled in physically separate passages. Alternative heat exchange structure will be described in connection with FIG. 2 of the drawing.

It should be noted that any increase or decrease in purity (and thus B.t.u. content) at the liquid phase product is accompanied by an inverse change in the efficiency of hydrocarbon recovery. The operation of the process can be controlled to vary these variables within limited ranges by changing the temperature at which the separation is effected at a given pressure; a relatively small increase in temperature serving to reduce the efficiency of separation and correspondingly increase the purity of the liquid product. The separation temperature is most easily controlled by minor adjustment in the operation of the heat exchangers, as by by-passing a small portion of one of the product streams. The same limited variation in product composition may be achieved by small controlled changes in the pressure at which separation is carried out. Still within the requirement of pressure reduction to substantially atmosphere, an increase of this pressure by only a few pounds will reduce the liquid product purity and at the same time increase the efficiency of hydrocarbon recovery.

As another aspect of the process of the present invention, if the hydrocarbon-rich product from the process is required to be at a pressure greater than the pressure at which the separation of the phases and withdrawal of the hydrocarbon-rich liquid is performed, the liquid phase is pressurized to the required pressure prior to its use as one of the fluid streams in indirect heat exchange relationship with the feed mixture. Pressurization of this product as a liquid prior to its vaporization in the heat exchanger requires much less power than to do so after vaporization.

The term "high pressure" as applied to the contaminant gas to be purified is used herein with reference to the pressures at which natural gas is typically produced at a wellhead or at which it is maintained in contemporary transmission systems. These pressures, however, do not represent critical limitations on the process which may accept gaseous feed at higher or lower pressures down to at least several atmospheres. Although the process is applicable to various contaminants, it is described herein with reference to nitrogen as the contaminant, an incombustible found in many hydrocarbon reservoirs. It will also be understood that the term "purification" as used herein refers to removal of a sufficient amount of contaminant to render the hydrocarbon gas marketable under the prevailing local conditions.

BRIEF DESCRIPTION OF THE DRAWING

FIG. 1 is a flow sheet for the practice of one embodiment of the invention;

FIG. 2 is a schematic representation of an alternate heat exchange system usable in the process; and FIG. 3 is a flow sheet of another embodiment incorporating the embodiment shown in FIG. 1.

DESCRIPTION OF THE PREFERRED EMBODIMENTS

With particular reference to FIG. 1, high-pressure feed natural gas containing a substantial proportion of nitrogen, as for example 30% by volume, produced from a wellhead 10 at a pressure which is typically in excess of 100 atmospheres, is passed through a feed conditioning system shown in the upper part of the figure.

The conditioning system comprises a regulator valve 12 and heater 13 to bring the pressure of the feed gas down to about 1500 p.s.i. and to maintain a temperature of about 65° F. in line 14. The feed is passed through a separator 15 to remove condensed liquids, a chiller 16 wherein it is cooled by one of the product streams to further condense and remove water and high-boiling hydrocarbons, a filter 17 to remove suspended liquids and solids and thereafter through one or the other of parallel dryers 18 and 19 and parallel filters 20 and 21. The dryers 18 and 19 and filters 20 and 21 are arranged in parallel to permit alternate use and regeneration by means of a valving system as shown. The conditioning system functions to stabilize the pressure and temperature of the feed and remove therefrom unwanted components which will freeze in the subsequent processing.

The cleaned feed gas stream leaves the conditioning system through a line 22 and valve 23 and is divided prior to entry into a primary heat exchanger 24 and a secondary heat exchanger 25. For example, about 80% of the feed gas stream can be passed through the primary heat exchanger while the remaining 20% is passed through the secondary heat exchanger, the proportions being controlled by valves 26 and 27 downstream of the exchangers. This ratio can be adjusted in accordance with the relative cooling capacities of the counterflowing streams in the primary and secondary heat exchangers and, in addition, adjustment of this ratio can be used as one means to control the degree of cooling of the feed gas stream and thereby to control the end product gas composition.

The portion of the feed gas passing through the primary heat exchanger is cooled therein by indirect heat exchange with a counterflowing hydrocarbon-rich product stream which originates as the liquid phase of the separation, as will be later described. The portion of the feed gas passing through the secondary heat exchanger is cooled therein by indirect heat exchange with a counterflowing contaminant-rich product stream which originates as the vapor phase of the separation. Typically, the feed gas passes through the tube side of the heat exchangers.

The separate portions of the feed stream leaving the heat exchangers are, as described above, at substantially the same temperature and are separately expanded through valves 26 and 27 to substantially atmospheric pressure. The expanded streams are recombined in line 28. By the cooling resulting from the indirect heat exchange within the heat exchangers, the feed streams emerging from the exchangers generally consist of a supersaturated liquid. However, if cooling of the feed takes place below its critical pressure, the feed stream may be cooled to the state of a two-phase fluid. The expansion through valves 26 and 27 produces a vapor phase and a liquid phase at a pressure which is as close to atmospheric as is practical and within the limits of control as above described. Other means to produce the expansion in volume, such as a turbine expander, for example, either alone or in conjunction with an expansion valve, may also be used.

The liquid-vapor mixture then passes through a valve 29 into a phase separation vessel 30 within which the liquid and vapor phases approach thermal equilibrium. The attendant compositional equilibrium results in a hydrocarbon-rich liquid and a nitrogen-rich vapor. The fraction of each constituent, namely hydrocarbons and nitrogen, in the liquid and vapor phases is governed as described above by the pressure and temperature equilibrium which is established in the phase separation vessel by the expansion through valves 26 and 27 and the degree of cooling established in the heat exchangers. The pressure, which is to be maintained as close to atmospheric as possible, is dependent only upon the amount of vapor formed and the pressure drop characteristics through the remainder of the system which may be controlled by means of valve 32A in vent line 32.

The vapor phase in the phase separation vessel is withdrawn from the upper portion of the vessel through a line 31 and passed through secondary heat exchanger 25 in indirect heat exchange relationship with a portion of the in-flowing feed stream as described above. The vapor phase is vented to the atmosphere or otherwise disposed of as waste or recovered as a by-product through line 32 following the already-described heat exchange. By means of by-pass 48 controlled by valve 48A, a controlled portion of the gas stream may be by-passed around heat exchanger 25 to obtain a small increase in the temperature within the phase separation vessel, as discussed above.

The liquid phase in the phase separation vessel is removed through a line 33 and pressurized by a pump 34 to a pressure somewhat greater than delivery line pressure. A return line 35 and valve 36 permit variable control of the liquid flow through line 37 so as to permit maintenance of a controlled liquid level in the separation vessel. The re-pressurized liquid phase passes through line 37 into the primary heat exchanger 24 where indirect heat exchange with the major portion of the feed stream takes place. The low temperature and associated heat absorption capacity (including the heat of vaporization)

of the hydrocarbon-rich liquid phase is therefore utilized to bring the balance of the feed stream to its substantially liquid state.

The heat exchange within the primary heat exchanger vaporizes the hydrocarbon-rich stream which leaves the exchanger through a line 38 and passes through back-pressure regulator 39, line 40 and chiller 16 to a product delivery line 40A. A portion of the end product in line 38 may be sampled by a composition analyzer 41. The latter may be a comparative infrared absorption device which continuously monitors the composition of the end product, and provides an output signal which can be used for control purposes. The output of the analyzer may also be employed to interrupt delivery and trigger an alarm in the event the nitrogen level in the hydrocarbon product stream exceeds the maximum permissible limit.

In the practice of the process as described, a natural gas having about 30% nitrogen contamination, for example, can be treated to produce a product having only about 7% nitrogen, which is well within normal commercial standards for fuel use. In the following table, approximate temperatures and pressures at various points in the process are shown for processing a feed gas consisting of 70% methane and 30% nitrogen at a pressure of 1500 p.s.i. at line 14 and a flow rate of approximately 3,000,000 cu. ft. per day.

TABLE

| Station | Pressure (p.s.i.a.) | Temp., °F. | Mole fraction N2 |
|---|---|---|---|
| Line 22 | 1,500 | 65 | 0.30 |
| Input to valves 26 and 27 | 1,450 | −211 | 0.30 |
| Line 28 | 20 | −277 | 0.30 |
| Line 31 | 20 | −277 | 0.71 |
| Line 33 | 20 | −277 | 0.07 |
| Line 37 | 500 | −272 | 0.07 |
| Line 40 | 470 | 45 | 0.07 |
| Line 32 | Atm. | 18 | 0.71 |

It will be seen from the table that the low temperature and associated heat absorption capacity of both the vapor phase and liquid phase is effectively utilized to bring the feed stream to the liquid state in advance of expansion in such manner that the temperature of the two portions thereof at the inlet of expansion valves 26 and 27 is ideally the same. In this manner, the heat transfer between the feed valve and the two fluid streams takes place between the highest possible feed stream temperature and the lowest possible treated stream temperature. If any portion of the gas phase is by-passed through line 48 in order to increase the temperature in the phase separation vessel, for the purpose as above described, a small departure from this ideal condition results.

It is noted that the vaporized liquid product leaves the primary heat exchanger at 45° F. and the gaseous product leaves the secondary exchanger at 18° F. Compared to the temperatures of −272° F. and 277° F. at which these streams enter the respective exchangers, this relatively small differential satisfies the objective of discharging these two streams at substantially the same temperature.

In spite of the functioning of the feed conditioning system to remove most of the water and high-boiling components from the feed, some of these components do enter the separation system and eventually portions of the heat exchangers and valves become coated with ice or hydrates. From time to time it is necessary therefore to discontinue the separation process and purge the system of these interfering solids. The piping utilized solely for this purpose is shown in broken lines to indicate that it serves no functon in the separation process as such. To purge the system, feed-flow is stopped by closing valve 23, and is by-passed through regulator 42, heater 43, line 44, valve 45 to backflow the warmed feed through expansion valves 26 and 27 and heat exchangers 24 and 25, and is exhausted through valve 46 carrying with it the now vaporized water and high-boiling materials which had accumulated in the expansion valves and heat exchangers. Valve 29 is closed during this regeneration, and pump 34 is stopped to preferably maintain the two phases in the separation vessel so that the separation process may be restarted with a minimum of down time.

Regulator 42 and heater 43 may also be employed to cyclically and alternately regenerate the dual filters and dryers in the conditioning system in similar fashion and by means of the illustrated valves and flow lines arranged in conventional manner.

Although the embodiment of the process described in FIG. 1 shows separate primary and secondary heat exchangers, the process can also be practiced wherein the heat exchange between the feed stream and the two treated fluid streams occurs within a single-shell heat exchanger. Such a single-shell heat exchanger is shown schematically in FIG. 2. The heat exchanger has a shell 50 with upper and lower tube sheets 51 and 52. A single tube 53 is shown extending between tube sheets 51 and 52 in conventional fashion and illustrative of a plurality of such tubes which would be incorporated therein in actual practice. Secondary upper and lower tube sheets 54 and 55 support tube 56 coaxially around tube 53. Transverse baffles 57 are spaced longitudinally in the shell. Feed is introduced into header chamber 58 between tube sheets 51 and 54, flows through the annulus between tubes 53 and 56 and similar annulus between corresponding tube pairs (not shown), and exists from a header chamber 59 between header plates 52 and 55. The liquid product stream is introduced at the header chamber 60, flows through tube 53 countercurrently to the feed flow and is withdrawn from header chamber 61. The gaseous product is introduced into the shell 50 through port 62, is directed by the baffles 57 in cross-counterflow relationship to the feed, and exits through port 63.

The exchanger shown in FIG. 2 accomplishes the same result as the parallel heat exchanges shown in FIG. 1 in that the two product streams function in parallel, each producing cooling of the feed stream throughout the entire temperature drop of the feed stream in substantially the same manner as described with relation to the separate parallel heat exchanger in FIG. 1.

With reference to FIG. 3, a modification of the system of FIG. 1 is illustrated in which certain components of the system are duplicated so that periodic purging as previously described may be carried out without interruption of deliveries of processed gas.

In the FIG. 3 system, a single feed conditioning sequence is again shown and constitutes a duplication of a portion of that shown in FIG. 1.

As described previously in reference to FIG. 1, the feed gas from the wellhead 10 is passed successively through regulator valve 12, heater 13, separator 15, chiller 16 and filter 17. Thereafter, the partially cleaned feed stream is passed from the conditioning system through line 71 and feed shutoff valve 72 into the process system.

In the practice of the process as illustrated in FIG. 3, one set of duplicate components are used to perform the process functions of drying, cooling and expanding the feed stream while the other set of such components are purged of accumulated moisture, ice and hydrates in a manner to be described subsequently. For the purpose of describing the process, it will be assumed that the set of components identified by the letter A are those being utilized in processing, while the components identified by the letter B are being purged.

The feed stream passes through valve 73A to dryer 74A and is split into two streams, whose proportions are controlled by valves 75A and 76A prior to being cooled and substantially condensed in primary heat exchanger 77A and secondary heat exchanger 78A, after which the two streams are recombined in line 79A. This single cooled feed stream is expanded through valve 80A producing liquid and vapor phases in line 81A at substantially atmospheric pressure. Expansion valve 80A is preferably adjustable, and in which case it may be employed to control the mass flow of feed gas through the system.

A heater 82A in line 81A may be activated as required to control the final quality (i.e. fraction of liquid and vapor phase) of the expanded feed and thus afford another means of controlling the nitrogen content of the end product gas. This heater is not necessary for the practice of the invention but is useful in control of the process.

The expanded two-phase stream is then passed through valve 83A and into phase separation vessel 84 in which equilibrium is attained, as previously explained.

The vapor from the vessel 84 is withdrawn through line 85 and employed as the cooling medium in secondary heat exchanger 78A, after which it is discharged from the process system through valve 86A.

The liquid phase in the vessel 84 is removed through line 87 and pumped to a pressure above delivery pressure by either of pumps 88 or 89 prior to passage through line 90 to primary heat exchanger 77A where it cools the major portion of the feed stream. As in the system of FIG. 1, a return line 91 and valve 92 permit variable control of the liquid flow through line 90 and consequent regulation of liquid level in vessel 84. Dual pumps 88 and 89 permit maintenance to be effected without interruption of product delivery, but are not required for the utilization of the process system employing duplicate components as described herein.

The vaporized product stream from primary heat exchanger 77A passes through valve 93A, back-pressure regulator 94 and chiller 16 to product delivery line 95.

The dryer 74B, heat exchangers 77B and 78B, and expansion valve 80B are subjected to purging and regeneration while processing as just described is taking place. To accomplish purging of the B-components while processing in the A-system, a small stream of feed gas is withdrawn downstream of dryer 74A through line 100A, valve 101A, valve 102B and heater 82B so as to backflow the warmed feed gas through expansion valve 80B and primary and secondary heat excahngers 77B and 78B to thereby remove solid materials, as described with reference to the system of FIG. 1. During this process, valves 93B, 73B, 86B, 101B, 103B, 83B and 102A are closed, and valve 104B is open to vent the purge gas and the liquefied and vaporized water and high-boiling hydrocarbon components removed from the system thereby. Simultaneously, an additional small flow of feed gas is bled from system-A through line 106 and valve 107 to provide a backflow of purge gas for dryer 74B. An integral heater (not shown) in dryer 74B warms the dryer bed during regeneration so that accumulated water and high-boiling hydrocarbons are driven off and vented through line 108B and valve 109B, valve 109A being closed during this operation.

At appropriate times the cycles are reversed and the A-system is purged in the manner described, while the B-system is utilized for processing the feed. The phase separation vessel continue to operate in the same manner regardless of which of the duplicate systems are in use.

As has been described in some detail, the composition of both the liquid and gaseous phase products may be controlled within a limited range by minor controlled variations of the equilibrium temperature within the phase separation vessel. One means of effecting such control is illustrated in FIG. 1 and involves bypassing a portion of the gaseous product around the secondary heat exchanger. The same result may be achieved by the trimmer heaters 82A and 82B in FIG. 3. A third and preferred method of effecting minor variations in the equilibrium temperature within the phase separation vessel is to by-pass a small amount of the relatively warm input feed around the heat exchangers and reintroduce it to the chilled feed upstream or downstream of the expansion valve or valves. In the FIG. 3 system, feed may be thus by-passed through lines 110A and 110B controlled respectively by valves 111A and 111B.

It will be appreciated that instruments, automatic controls, and other accessory equipment for maintenance may be incorporated in the system without departing from the invention.

From the foregoing description, it will be seen that a process for purification of hydrocarbon gases to the extent necessary to make such gases marketable is achieved without the use of rectification columns or external refrigeration. Through liquefaction and phase separation, as has been described, the B.t.u. value of a hydrocarbon gas having substantial proportions of incombustible contaminants can be raised to an acceptable level in an efficient and economical manner.

The specific features of embodiments of the process of the present invention have been set forth merely by way of example to illustrate forms in which the invention may be practiced. Modifications of these specific features may be made without departing from the scope of the invention.

We claim:
1. A process for separating a high pressure normally gaseous natural gas mixture comprising predominantly nitrogen and methane into a first product stream containing a substantially higher proportion of methane than the mixture and a second product stream containing a substantially higher proportion of nitrogen than the mixture characterized by effecting such separation without conventional fractionation, the process comprising:
   (a) dividing the natural gas mixture into separate streams and cooling the separate streams by passing them in parallel counterflow heat exchange relation to the first and second product streams in a primary and secondary heat exchange means,
   (b) expanding the resultant cooled mixture to a reduced pressure as near atmospheric pressure as possible, the excess pressure above atmospheric pressure accounting for pressure drop in the discharge of the second product stream through the system to atmosphere, the expanded cooled mixture being introduced into a single stage separation zone to produce in the separation zone a single methane-rich liquid phase and a single nitrogen-rich gaseous phase in approximate thermal equilibrium at said reduced pressure,
   (c) continuously and separately withdrawing from the separation zone separate streams of the methane-rich liquid phase as the first product stream and the nitrogen-rich gaseous phase as the second product stream, and
   (d) separately passing at least a portion of each of the product streams in out-of-heat exchange relation with each other and in counterflow heat exchange relation to the natural gas mixture in the primary and secondary heat exchange means as recited in step (a), the separate streams of natural gas mixture passing through the primary and secondary heat exchange means in out-of-heat exchange relation with each other.

2. A process in accordance with claim 1 in which said portion of the first product stream is caused to vaporize in heat exchange with the contaminated gas mixture.

3. A process in accordance with claim 1 in which the first product stream withdrawn from the separation zone is pressurized prior to passage through the heat exchange means to a pressure in excess of that subsisting in the separation zone.

4. A process in accordance with claim 1 in whicn substantially all of each of the first and second product streams is passed in heat exchange relation to the contaminated gas mixture throughout the entire temperature range through which the gas mixture is cooled in the heat exchange means.

5. A process in accordance with claim 1 in which separate portions of the gas mixture are cooled by passing the portions separately in counterflow heat exchange relation to the first and second product streams and controlling the portions of the gas mixture such that the temperature of each of the portions thereof after heat exchange with the first and second product streams is substantially equal and the temperature of each of the first and second product streams after countercurrent heat exchange with the separate portions of the gas mixture is substantially equal.

6. A process in accordance with claim 1 in which the composition of the gaseous and liquid phases in the separation zone is controlled by varying the temperature in the separation zone.

7. A process in accordance with claim 6 in which the temperature in the separation zone is varied by by-passing a portion of the natural gas mixture around the heat exchange means.

8. A process in accordance with claim 6 in which the temperature in the separation zone is varied by by-passing one of the product streams around the heat exchange means.

9. A process in accordance with claim 6 in which the temperature in the separation zone is varied by adding heat to the cooled mixture prior to its introduction into the separation zone.

10. A process in accordance with claim 1 in which the liquid phase in the separation zone is controlled to a selectable predetermined quantity.

References Cited

UNITED STATES PATENTS

| | | | |
|---|---|---|---|
| 1,272,059 | 7/1918 | Lacy | 62—11 |
| 2,557,171 | 6/1951 | Bodle. | |
| 2,716,332 | 8/1955 | Haynes | 62—41 XR |
| 2,973,834 | 3/1961 | Cicalese. | |
| 3,158,010 | 11/1964 | Kuerston. | |
| 3,205,669 | 9/1965 | Grossmann | 62—23 |
| 3,255,596 | 6/1966 | Greco et al. | 62—23 |
| 3,282,059 | 11/1966 | Maher et al. | 62—12 |
| 3,292,381 | 12/1966 | Bludworth | 62—27 XR |
| 3,360,946 | 1/1968 | Di Napoli | 62—23 XR |

NORMAN YUDKOFF, Primary Examiner

U.S. Cl. X.R.

62—15, 41

PO-1050
(5/69)

UNITED STATES PATENT OFFICE
CERTIFICATE OF CORRECTION

Patent No. 3,488,677  Dated January 6, 1970

Inventor(s) Richard R. Tracy and Reginald G. Spear

It is certified that error appears in the above-identified patent and that said Letters Patent are hereby corrected as shown below:

Column 6, line 28, "exists" should read --exits--.
Column 7, line 57, "continue" should read --continues--.

SIGNED AND
SEALED

JUL 21 1970

(SEAL)
Attest:

Edward M. Fletcher, Jr.
Attesting Officer

WILLIAM E. SCHUYLER, JR.
Commissioner of Patents